United States Patent
Andrews

[11] Patent Number: 5,864,105
[45] Date of Patent: Jan. 26, 1999

[54] METHOD AND APPARATUS FOR CONTROLLING AN ADJUSTABLE DEVICE

[75] Inventor: Scott S. Andrews, Aichi, Japan

[73] Assignee: TRW Inc., Lyndhurst, Ohio

[21] Appl. No.: 777,753

[22] Filed: Dec. 30, 1996

[51] Int. Cl.[6] .................................................. H01H 9/00
[52] U.S. Cl. ........................................ 200/5 R; 307/10.1
[58] Field of Search ........................... 116/279; 180/333;
200/5 R, 5 A, 6 R, 6 A, 17 R, 18, 52 R,
512, 517, 308, 310, 314; 307/9.1, 10.1;
318/282, 286; 400/490, 494

[56] References Cited

U.S. PATENT DOCUMENTS

| | | | |
|---|---|---|---|
| 4,473,724 | 9/1984 | Suzuki | 200/5 R |
| 4,550,221 | 10/1985 | Mabusth | 178/18 |
| 4,678,872 | 7/1987 | Gutman | 200/5 R |
| 4,695,682 | 9/1987 | Winogrocki | 200/5 R |
| 4,725,694 | 2/1988 | Auer et al. | 178/18 |
| 4,791,252 | 12/1988 | Mayer | 200/52 R |
| 4,808,897 | 2/1989 | Saito et al. | 318/568 |
| 5,128,500 | 7/1992 | Hirschfeld | 200/5 R |
| 5,245,142 | 9/1993 | Sacco et al. | 200/5 R |
| 5,278,363 | 1/1994 | Krieg et al. | 200/5 R |
| 5,384,440 | 1/1995 | Wnuk et al. | 200/5 R |
| 5,432,304 | 7/1995 | Tanahashi | 178/18 |
| 5,451,724 | 9/1995 | Nakazawa et al. | 178/20 |
| 5,465,103 | 11/1995 | Yoshioka | 345/104 |

*Primary Examiner*—Michael A. Friedhofer
*Attorney, Agent, or Firm*—Tarolli, Sundheim, Covell, Tummino & Szabo

[57] ABSTRACT

An apparatus (10) and a method for controlling adjustment devices (12) which are operable to adjust an object such as a seat (14). Each of the adjustment devices (12) adjusts an adjustable aspect of the seat (14). A touch pad (22) has an array of manually touchable areas (24) and provides signals indicative of manual touches to the areas (24). A guide (44) is adjacent to the touch pad (22) and has surfaces (56, 60) which define a representation of the seat (14). The areas (24) of the touch pad (22) within the representation of the seat correspond to adjustment aspects of the seat (14). A matrix controller (28) receives the signals provided by the touch pad (22) and provides a touch indicating signal to a process controller (30). The process controller (30) processes information contained within the signal from the matrix controller (28) and generates control signals for controlling operation of the adjustment devices (12) responsive to manual touches to the areas (24) of the touch pad (22).

28 Claims, 6 Drawing Sheets

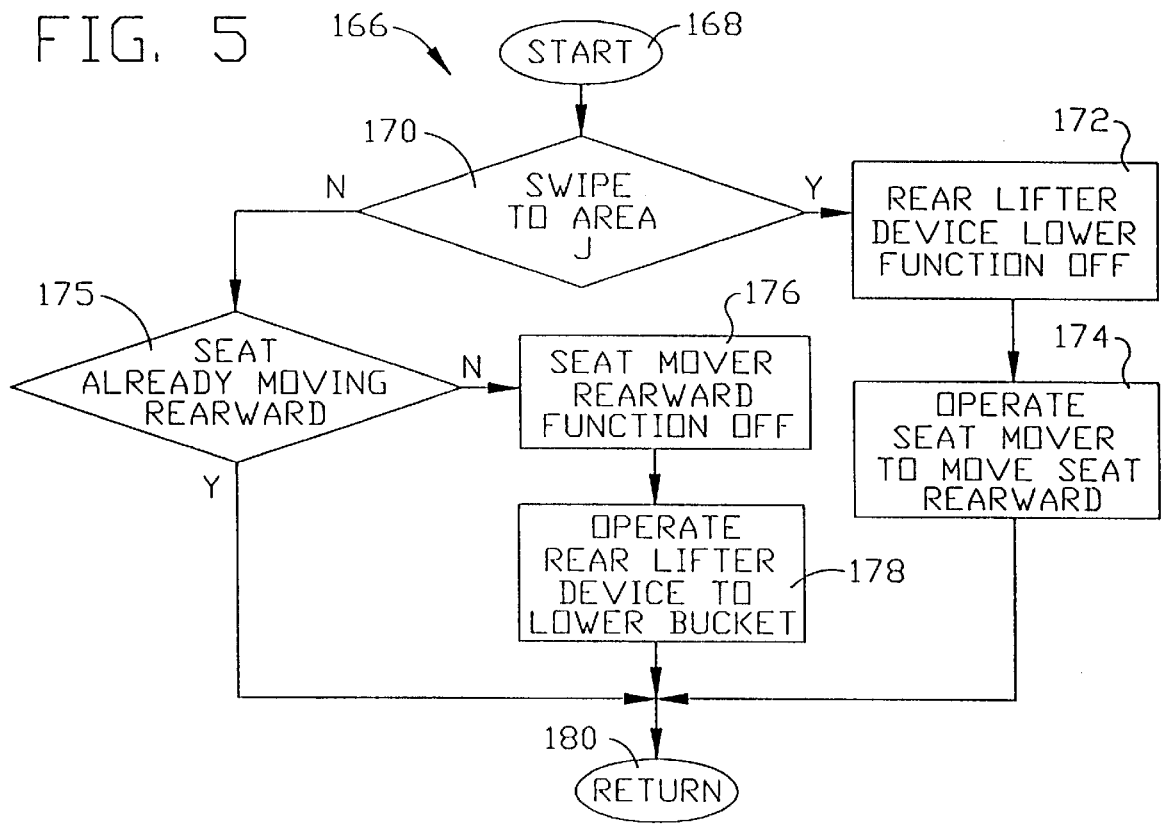
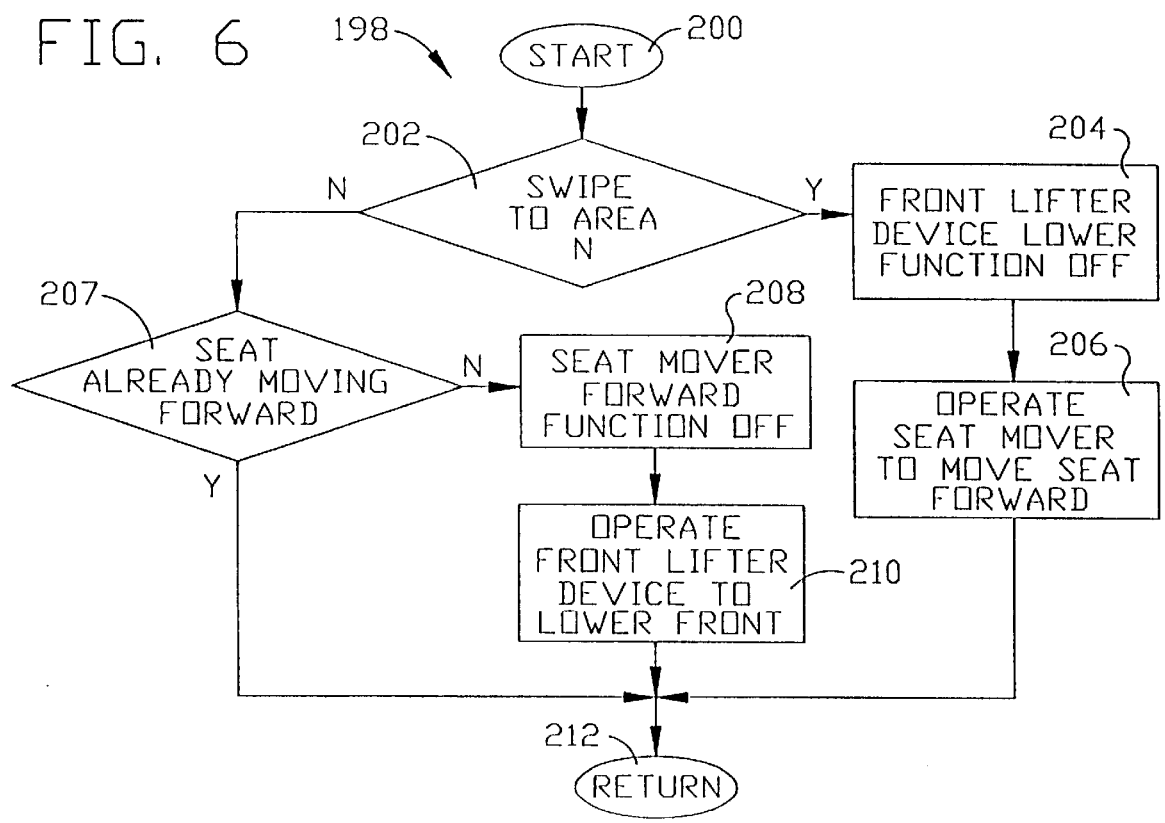

METHOD AND APPARATUS FOR CONTROLLING AN ADJUSTABLE DEVICE

TECHNICAL FIELD

The present invention is generally directed to a method and apparatus for controlling adjustable devices and is particularly directed to a system in which manual inputs are used to control adjustment of an adjustable object such as a vehicle seat.

BACKGROUND OF THE INVENTION

Vehicle seat adjustment systems are known in the art.

A typical vehicle seat has many adjustable aspects such as seat back inclination, lumbar support, seat tilt, and vertical and horizontal seat position. Each of these adjustable aspects requires one or more devices, such as stepper motors, to carry out the desired adjustment operation.

One known system includes the use of numerous, separate, manually actuatable switches for controlling the numerous adjustment devices. These switches are mounted either on an armrest of the vehicle or on the side of the seat. This known system is not intuitive because the switches are often not seen by the user and the function of each switch may not be obvious until the switch is activated.

Another known system for controlling seat adjustment devices includes a metaphoric switch assembly. The switches for controlling the adjustment devices are located in close proximity to one another and only a few tactile actuators are used to operate the switches. The actuators are shaped like the seat back and the seat bottom, and are a representation, or a metaphor, of the seat. However, because the numerous switches are operated by only a few actuators, the switch assembly is relatively complex, with multiple contacts and many moving parts.

SUMMARY OF THE INVENTION

The present invention provides a method and apparatus for controlling adjustment devices which are operable to adjust an object, such as a seat. Each of the adjustment devices adjusts an adjustable aspect of the seat. A touch pad means has an array of manually touchable areas and provides signals indicative of manual touches to the areas. A guide is adjacent to the touch pad means. The guide has surface means which define or outline a representation of the object, e.g., the seat. The representation of the object corresponds to a shape of the object. The areas of the touch pad means within the representation of the object correspond to adjustable aspects of the seat. A control means receives the signals provided by the touch pad means and generates control signals for controlling operation of the adjustment devices responsive to manual touches to the areas of the touch pad means.

BRIEF DESCRIPTION OF THE DRAWINGS

Further features and advantages of the present invention will become apparent to those skilled in the art to which the present invention relates from reading the following description with reference to the accompanying drawings, in which:

FIGS. 4A–4C, 5, and 6 are flow charts showing a control process according to the present invention.

DESCRIPTION OF PREFERRED EMBODIMENT

Figure 1:
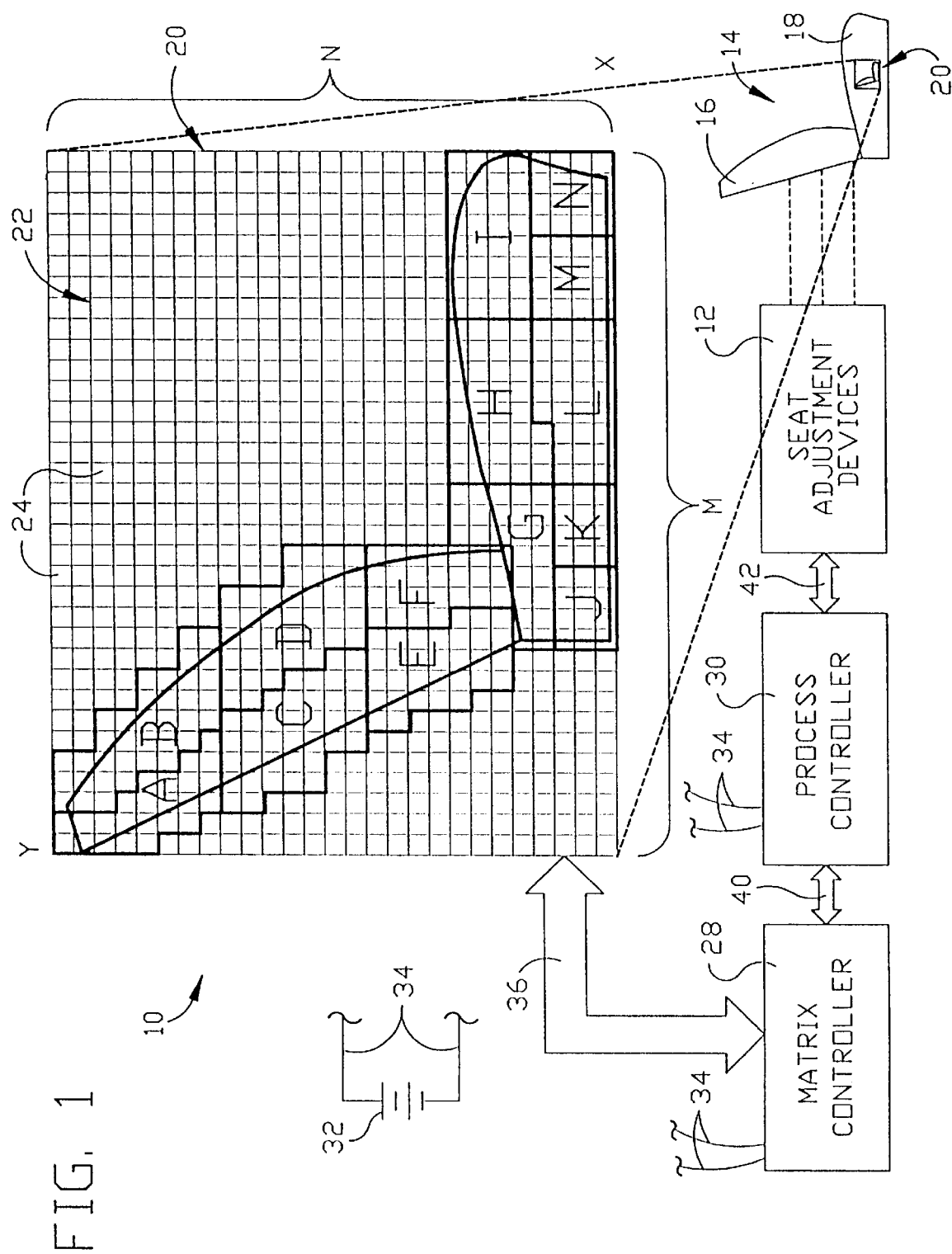
FIG. 1 is a schematic diagram of an apparatus according to he present invention.

One representation of the present invention is schematically shown in FIG. 1 as an apparatus 10 for controlling seat adjustment devices 12 operable to adjust a seat 14. It will be appreciated that, although the representation of the present invention is directed to adjustment of a seat, the present invention is applicable to adjustment of other objects (e.g., a power window).

The seat 14 has a seat back 16 and a seat bottom 18 for receiving a seated occupant (not shown). The seat 14 has a plurality of adjustable aspects. Some examples of the adjustable aspects are: the inclination of the seat back 16 may be changed relative to the seat bottom 18; upper and lower lumbar supports of the seat back 16 may be varied; the entire seat 14 may be tilted in a front-to-back direction by raising or lowering a bucket or rear end of the seat, or by raising or lowering a front end of the seat; and the entire seat 14 may be vertically or horizontally moved. The seat 14 may have other adjustable aspects. Preferably, the seat 14 is a seat of a vehicle (not shown).

The seat adjustment devices 12 include suitable electrically actuatable mechanisms which cause adjustment of the adjustable aspects of the seat 14. For example, the seat adjustment devices 12 may include stepper motors for vertical, horizontal and tilt movement of the entire seat 14, and incline movement of the seat back 16. Also, the seat adjustment devices 12 may include inflatable bladders and air compressors for varying the upper and lower lumbar supports within the seat back 16. It is to be understood that the adjustment devices 12 may be operated in two directions. For example, an adjustment device for changing the inclination of the seat back 16 is operated in a first direction to recline the seat back and operated in a second direction to de-recline the seat back. The adjustable aspects of the seat 14 are adjusted by the seat occupant to achieve a desired position of the seat and to optimize the comfort of the occupant.

Control of the seat adjustment devices 12 to adjust the adjustable aspects of the seat 14 is accomplished by manual touching by the occupant on a tactile operator 20 of the apparatus 10. The tactile operator 20 is illustrated in FIG. 1 as being mounted on a side of the seat bottom 18 of the seat 14, and is also shown in FIG. 1 as an enlarged representation. It should be understood that the tactile operator 20 may be mounted at any suitable location on the seat 14 or may be remotely located from the seat such as on an arm rest.

The tactile operator 20 has a touch pad 22 with an N by M array of discreet, manually touchable areas 24. Specifically, the touch pad 22 has M columns of touchable areas 24 extending along an X abscissa and has N rows of touchable areas 24 extending along an orthogonal Y ordinate. Accordingly, the touch pad 22 has N x M touchable areas 24.

The touch pad 22 may be of any suitable construction which provides electrical signals indicative of the particular touchable areas 24 which are manually touched. For example, the touch pad 22 may include first and second arrays of conductive plates and an insulating layer which overlies the first and second arrays. The plates of one array are aligned in a plurality of rows and the plates of the second array are aligned in a plurality of columns. When an operator manually touches the outer surface of the insulating layer at a particular area, a change in capacitance occurs in one of the rows of the plates in the first array (i.e., a Y coordinate) and in one of the columns of the plates in the second array (i.e., an X coordinate). Each pair of plates, one column plate and one row plate, corresponds to a distinct one of the touchable areas 24. The signals provided by the touch pad 22 are indicative of which pairs of plates have a changed capacitance. Thus, the signals are indicative of which areas 24 are manually touched.

Another suitable construction of the touch pad may include a resistor layer, an insulating spacer layer and a conductor layer. The spacer layer is made up of a plurality of spacer pieces which are arranged so that electrical contact is made between the conductor layer and the resistor layer when a pressure is applied to a point on the conductor layer. As a result of the pressure, electrical current flows through a distinct pair of grid contacts. Signals are provided by the touch pad 22 which are indicative of the manually touchable area 24 at the location of the point of pressure application (i.e., X and Y coordinates).

The apparatus 10 includes a matrix controller 28 and a process controller 30 which are powered by electrical energy from any suitable source 32, such as a battery of the vehicle, through suitable voltage regulators (not shown) and supplied via electrical leads 34. The matrix controller 28 is connected to the touch pad 22 by connection lines 36. The matrix controller 28 provides electrical energy to energize the touch pad 22. The touch pad 22 provides the electrical signals, which indicate manual touches, to the matrix controller 28. In one example, the electrical signals are analog signals. The matrix controller 28 scans the electrical signals at a preselected frequency and generates a digital data signal which contains information bits indicative of the present state of each of the touchable areas (i.e., touched or not touched).

Connection lines 40 connect the matrix controller 28 and the process controller 30. The process controller 30 has memory and data processing capabilities. In the preferred embodiment, the process controller 30 is a microcomputer. The process controller 30 controls the matrix controller 28 to scan the electrical signals coming from the touch pad 22. The matrix controller 28 provides the digital data signal indicative of manual touches on the touch pad 22 to the process controller 30. The process controller 30 processes the information contained within the digital data signal from the matrix controller 28, and determines the desired seat adjustment.

It is to be understood that the process controller 30 and/or the matrix controller 28 have means to recognize and reject signals resulting from spurious or erroneous touches to the touch pad 22. For example, a debounce capability is provided to eliminate short, transient signals. A time delay (e.g., 0.5 second) is provided to ignore a first portion of a touch indicating signal to permit a certain amount of unintended touch to the touch pad 22. Also, a touch indicating signal existing for an inordinate duration is ignored. Such an extended duration signal may result from an article being jammed against the touch pad 22 (e.g., an umbrella or flashlight stored next to the touch pad).

The process controller 30 is connected to the seat adjustment devices 12 via connection lines 42 and the process controller generates electrical control signals for controlling operation of the seat adjustment devices. In FIG. 1, mechanical connections between the seat adjustment devices 12 (e.g. seat motors, lumbar supports, etc.) and the seat 14 are represented by dashed lines. It is to be understood that the seat adjustment devices 12 are appropriately located relative to the seat 14 and are appropriately connected to the seat for performing their adjustment functions.

Operation of each seat adjustment device 12 to perform its particular adjustment function is the result of manual touch to the touch pad 22. A distinct pattern of a touch or touches to the touch pad 22 is associated with each seat adjustment device 12. The process controller 30 recognizes the touch patterns in information contained within the digital signal from the matrix controller 28. A predetermined correspondence between a desired seat adjustment function and the associated touch pattern is accomplished in part by the presence of a cover bezel 44 (FIG. 2) of the tactile operator 20.

Figure 2:
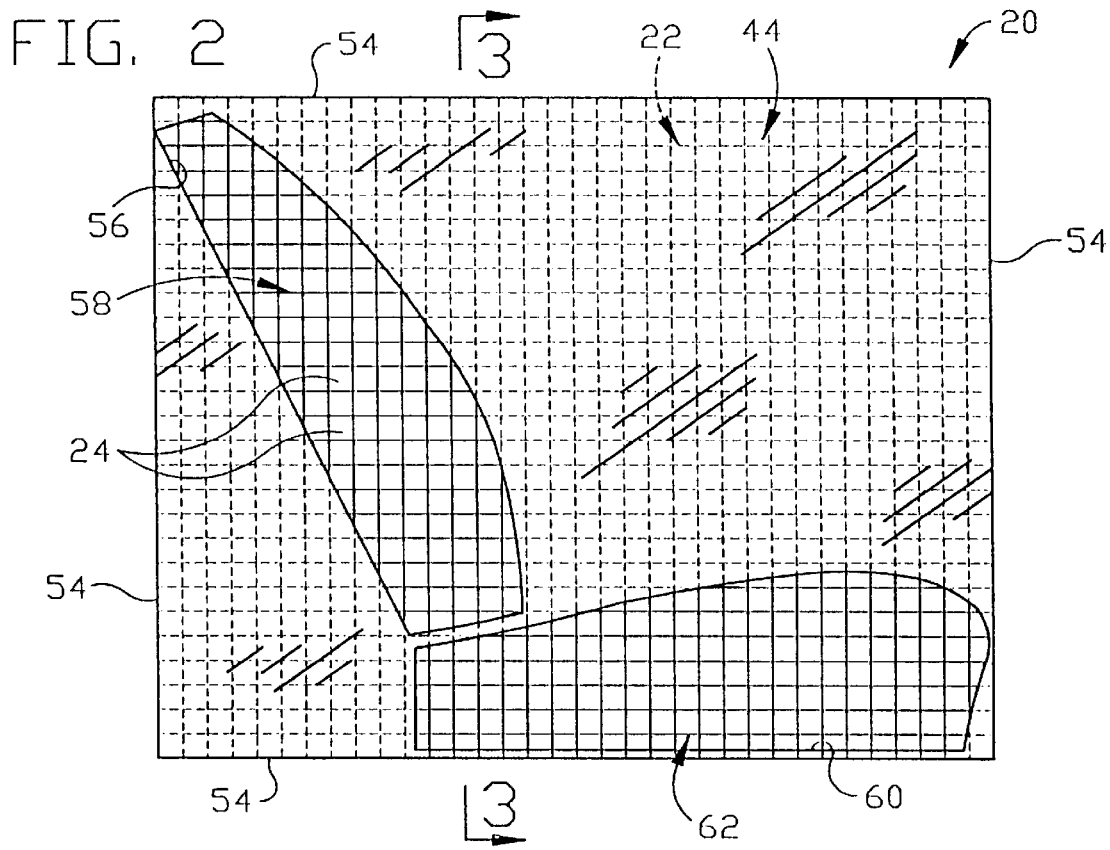
FIG. 2 is a pictorial representation of a touch pad and a guide according to the present invention.
Figure 3:
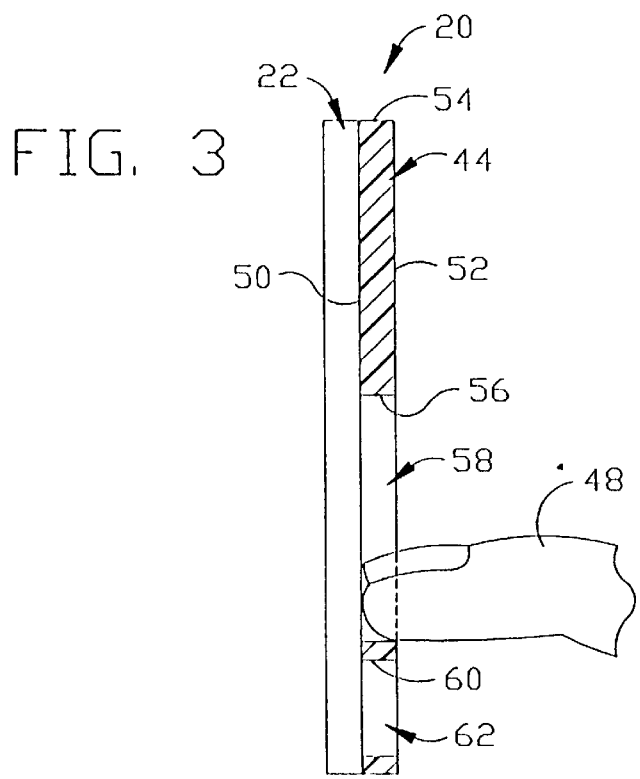
FIG. 3 is a side view of the parts shown in FIG. 2, with the guide being sectioned along line 3—3 of FIG. 2.

Referring to FIGS. 2 and 3, the cover bezel 44 may have any suitable construction which guides and constrains manual movement of an operator's finger relative to the touch pad 22. Preferably, the cover bezel 44 guides and constrains a finger tip 48 of the occupant. The cover bezel 44 guides manual movement relative to the touch pad 22 such that the manual movement is constrained to touch only predetermined touchable areas 24 which, taken together, are a representation of the shape of the seat 14. In accordance with a preferred embodiment, the representation of the seat 14 on the touch pad 22 includes a portion which represents the seat back 16 and a portion which represents the seat bottom 18. The representation has the appearance of the seat 14 when the seat is viewed from one side.

In the preferred embodiment, the cover bezel 44 is a rigid planar member made of plastic material and which overlies the touch pad 22. A first major side surface 50 of the cover bezel 44 faces the touch pad 22 and a second major side surface 52 faces away from the touch pad. Outer peripheral side surfaces 54 (FIG. 2) define the outer boundaries of the cover bezel 44. Preferably, the outer boundaries of the cover bezel 44 are the same as the outer boundaries of the touch pad 22 such that no touchable areas 24 are exposed around the outer periphery of the cover bezel 44.

An aperture edge surface 56 extends through the cover bezel 44 between the major side surfaces 50, 52 and bounds a seat back representation aperture 58 through the cover bezel. The surface 56 is configured such that the seat back representation aperture 58 exposes the group of touchable areas 24 which are in the representational shape of the seat back 16 of the seat 14. Another aperture edge surface 60 of the cover bezel 44 extends between the major side surfaces 50, 52 and bounds a seat bottom representation aperture 62. The surface 60 is configured such that the seat bottom representation aperture 62 exposes the group of touchable areas 24 which are in the representational shape of the seat bottom 18. All of the rest of the touchable areas 24, i.e., the touchable areas not within the representation of the seat, are covered by the cover bezel 44 such that the finger tip 48 cannot reach these areas.

Within the groups of touchable areas 24 exposed by the apertures 58 and 62 are sub-groups or zones of touchable areas 24 which are each associated with one or more of the seat adjustment devices 12. The dimensions of each zone are sufficiently large to permit a manual touch, such as by the finger tip 48, to the touchable areas 24 within the zone. In one example, the zones are slightly oversized and extend beyond the areas exposed by the apertures 58 and 62 (i.e., a portion of each zone may be covered by the cover bezel 44). The oversized zones permit a limited amount of variation in the alignment of the touch pad 22 and the cover bezel 44. Also, the oversized zones permit a limited amount of variations in the size of the areas exposed by the apertures 58 and 62.

The number of zones and the location of the zones are related to the number of adjustable aspects of the seat 14 and the particular types of adjustable aspects. The location of the zones of touchable areas 24 within the representations bounded by the apertures 58 and 62 are ergonomically selected such that there is a logical correspondence between the locations of the zones and the corresponding seat adjustment devices. A seat 14 which had only a few adjustable aspects may not require the number of zones shown for the preferred embodiment.

In the preferred embodiment, there are six zones which are accessible within the seat back portion defined by aperture 58 of the seat representation. The zones are identified as A–F in FIG. 1. Zones A and B are located at upper back and front segments, respectively, of the seat back portion of the representation. Zones C and D are at middle back and front segments, respectively, and zones E and F are at lower back and front segments, respectively. The touchable areas 24 located within the zones A and B are associated with a seat adjustment device 12 which can change the inclination of the seat back 16 relative to the seat bottom 18, i.e., an inclination device. Specifically, touching the touchable areas 24 within the zone A is a request to recline the seat back 16 relative to the seat bottom 18 and touching the touchable areas within the zone B is a request to de-recline the seat back relative to the seat bottom.

The touchable areas 24 located within the zones C and D are associated with a seat adjustment device 12 which can change an upper lumbar support, i.e., an upper lumbar device. Specifically, touching the touchable areas located within the zone C is a request for movement of the upper lumbar support inward (i.e., recess into seat back, away from the occupant) and touching the touchable areas in the zone D is a request for movement of the upper lumbar support outward (i.e., out from seat back, toward occupant). The touchable areas 24 located within the zones E and F are associated with a seat adjustment device 12 which can change a lower lumbar support, i.e., a lower lumbar device. Specifically, touching the touchable areas 24 within the zone E is a request for movement of the lower lumbar support inward (i.e., recess into seat back, away from the occupant) and touching the touchable areas within the zone F is a request for movement of the lower lumbar support outward (i.e., out from seat back, toward occupant). In the preferred embodiment, the type or pattern of touch to the touch pad 22 which results in operation of a particular seat back adjustment is a non-moving touch or constant press to the touchable areas 24 within a particular zone corresponding to a desired seat adjustment function. It is to be understood that more complex patterns of touches, e.g., multiple zone touching, could be used to control some seat adjustment devices.

In accordance with the preferred embodiment, there are eight zones which are accessible within the seat bottom portion defined by aperture 62 of the seat representation. The zones are identified as G–N. The top segment of the seat bottom portion of the representation is divided into three zones: G–I, with G being rearmost and I being foremost with respect to the seat representation. The bottom segment of the seat bottom portion of the representation is divided into five zones: J–N located in a sequence from back to front with respect to the seat representation. FIG. 1 illustrates zone L (the middle zone of the lower portion of the seat bottom representation) as being larger. However, it is to be understood that relative size of the zones is for illustration and discussion purposes and is not intended to limit the subject invention.

Each of the zones G–N of touchable areas 24 are associated with one or more seat adjustment devices 12. Specifically, some of the zones are involved in causing operation of more than one seat adjustment device 12, dependent upon the touch type or pattern. For example, actuation of one or more seat adjustment devices 12 can occur upon a non-moving touch or press to the touchable areas 24 within the corresponding zone(s) G–N. Alternatively, control of one or more of the seat adjustment devices 12 can occur in response to a manual swiping motion across a plurality of the zones G–N, thereby causing a sequential touching of a plurality of touchable areas 24, from one zone to another.

In the preferred embodiment, a non-moving touch to the touchable areas 24 located within the zone G is a request to move the bucket (back) of the seat bottom 18 upward by a seat adjustment device 12, such as a rear lifter device. A non-moving touch to the touchable areas 24 in the zone H is a request to move the entire seat upward, i.e., movement of the bucket and front of the seat bottom 18 upward by seat adjustment devices 12, such as front and rear lifter devices. Similarly, a non-moving touch within the zone I is a request to move the front of the seat bottom 18 upward, such as by a seat adjustment device 12 which is the front lifter device. A non-moving touch within the zones J and/or K is a request to move the bucket down, a non-moving touch within the zone L is a request to move the entire seat down, and a non-moving touch within the zones M and/or N is a request to move the front of the seat bottom 18 down, via operation of the appropriate seat adjustment devices 12.

Seat movements in the front-to-back direction are requested via the touch pad 22 by swiping a sequence of touchable areas 24 extending across a plurality of zones. In the preferred embodiment, a request to move the seat 14 in the forward direction (i.e., closer to the vehicle's instrument panel) corresponds to a manual swipe of the touch pad 22 starting in the zone L and extending through the zone M to the zone N. A request to move the seat 14 in the rearward direction corresponds to a manual swipe of the touch pad 22 starting in the zone L and extending through the zone K to the zone J. An appropriate seat adjustment device 12, i.e., a seat mover, is energized to move the seat 14 in the requested direction.

The duration of the operation of the seat adjustment devices 12 can be determined by any suitable means. Preferably, the duration for operation of the seat adjustment devices 12 which are requested based upon a non-moving (e.g., non-swiping) touch to the corresponding zone is determined based upon the length of the manual touch to the respective zone. The duration of the operation of the seat adjustment devices which are controlled by a manual swipe along the touch pad 22 can be controlled based upon the length of time that the finger tip 48 remains in engagement with the final zone.

For all of the requested seat adjustments, the cover bezel 44 guides the manual movement relative to the touch pad 22. Specifically, the hand of the seat occupant can feel the outline provided by the surfaces 56 and 60 which define the seat back and seat bottom representation apertures 58 and 62. The hand of the occupant can be moved along the respective surface 56 and 60, without the occupant viewing the cover bezel 44 and touch pad 22, such that the finger tip 48 can be moved to the location of the appropriate zone without causing operation of any of the seat adjustment devices 12. Further, a swiping motion can be accomplished by a tracing motion along the appropriate surface 56 and 60 of the cover bezel 44.

Figure 4A:
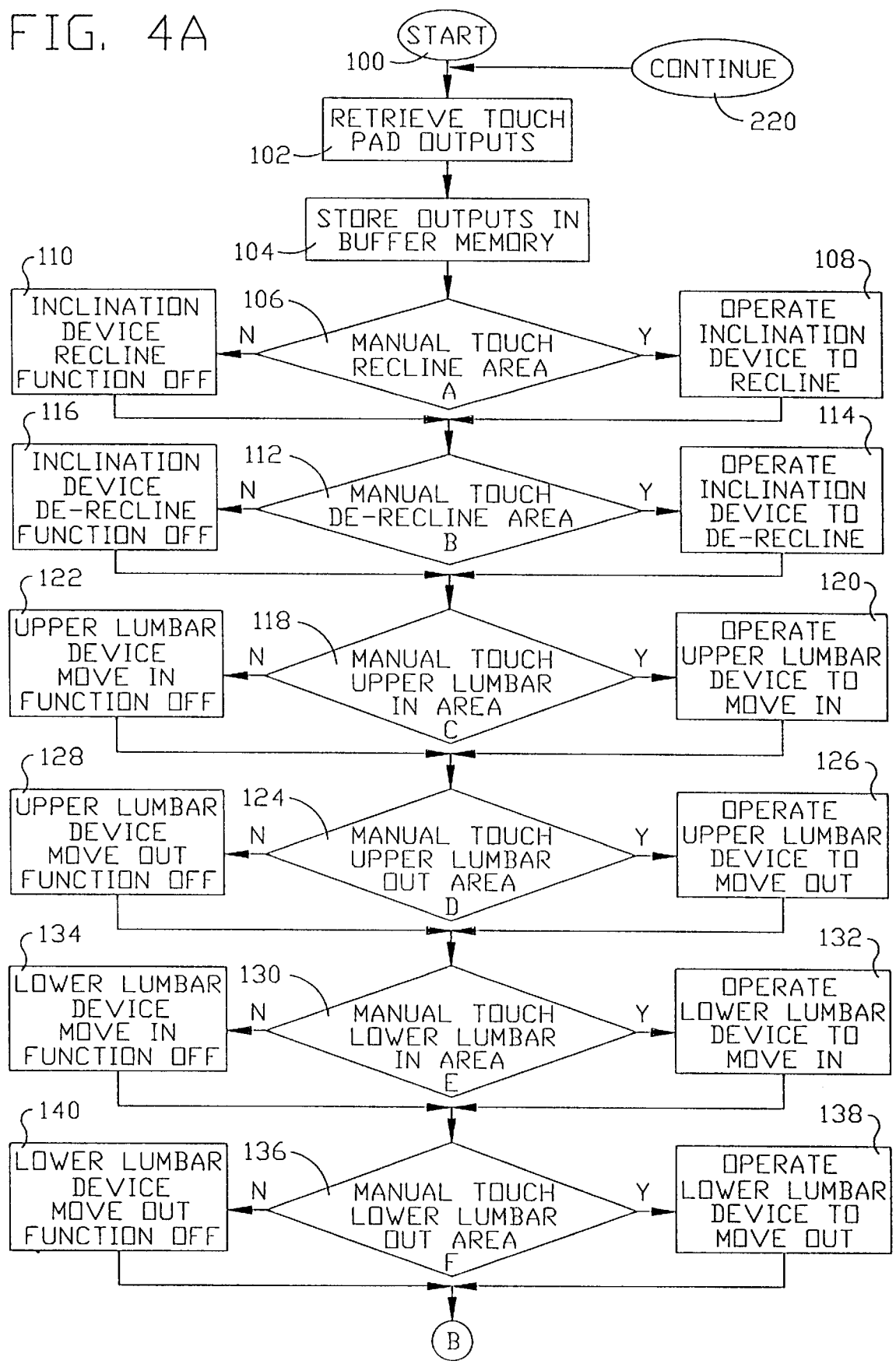
Figure 4B:
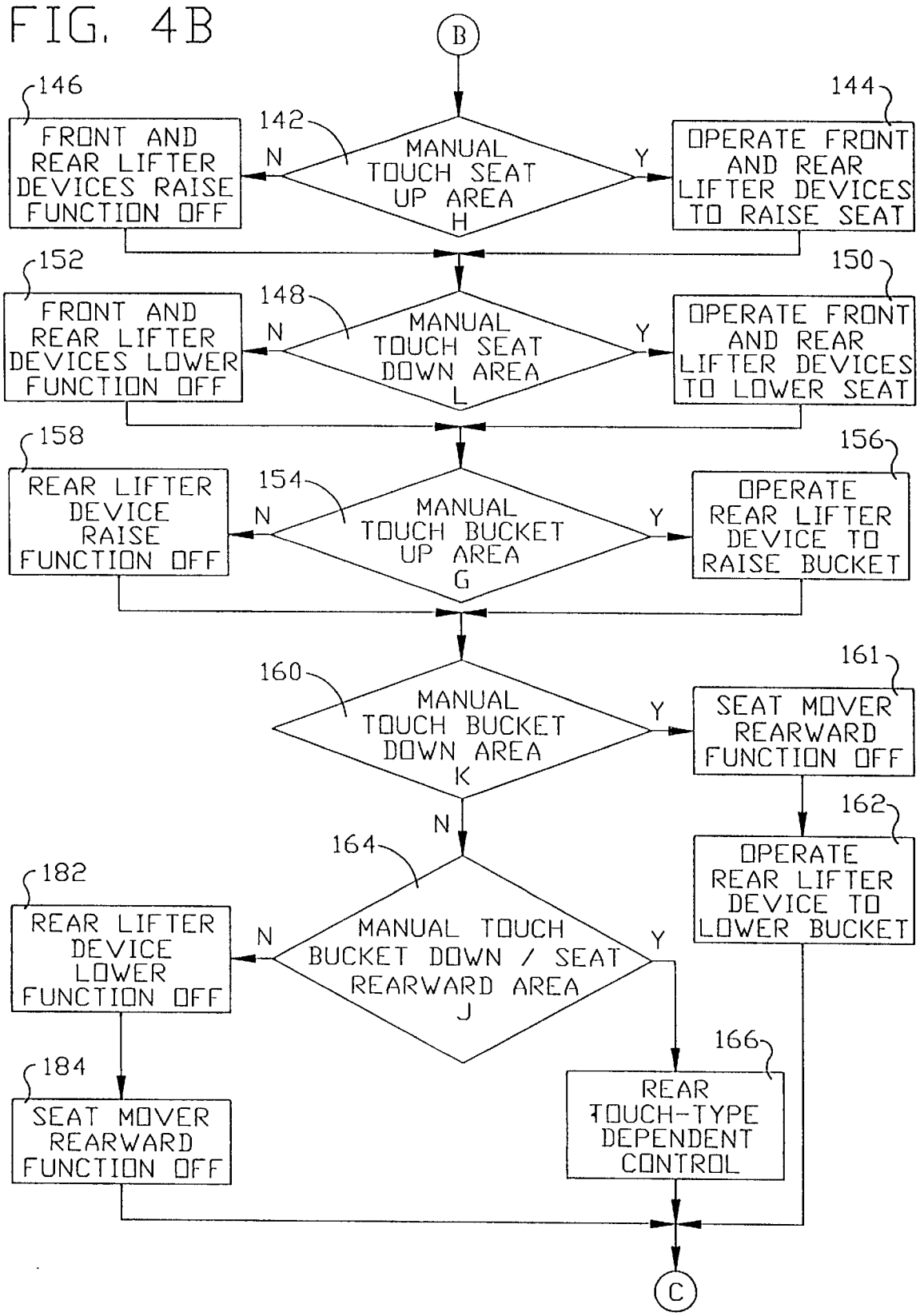
Figure 4C:
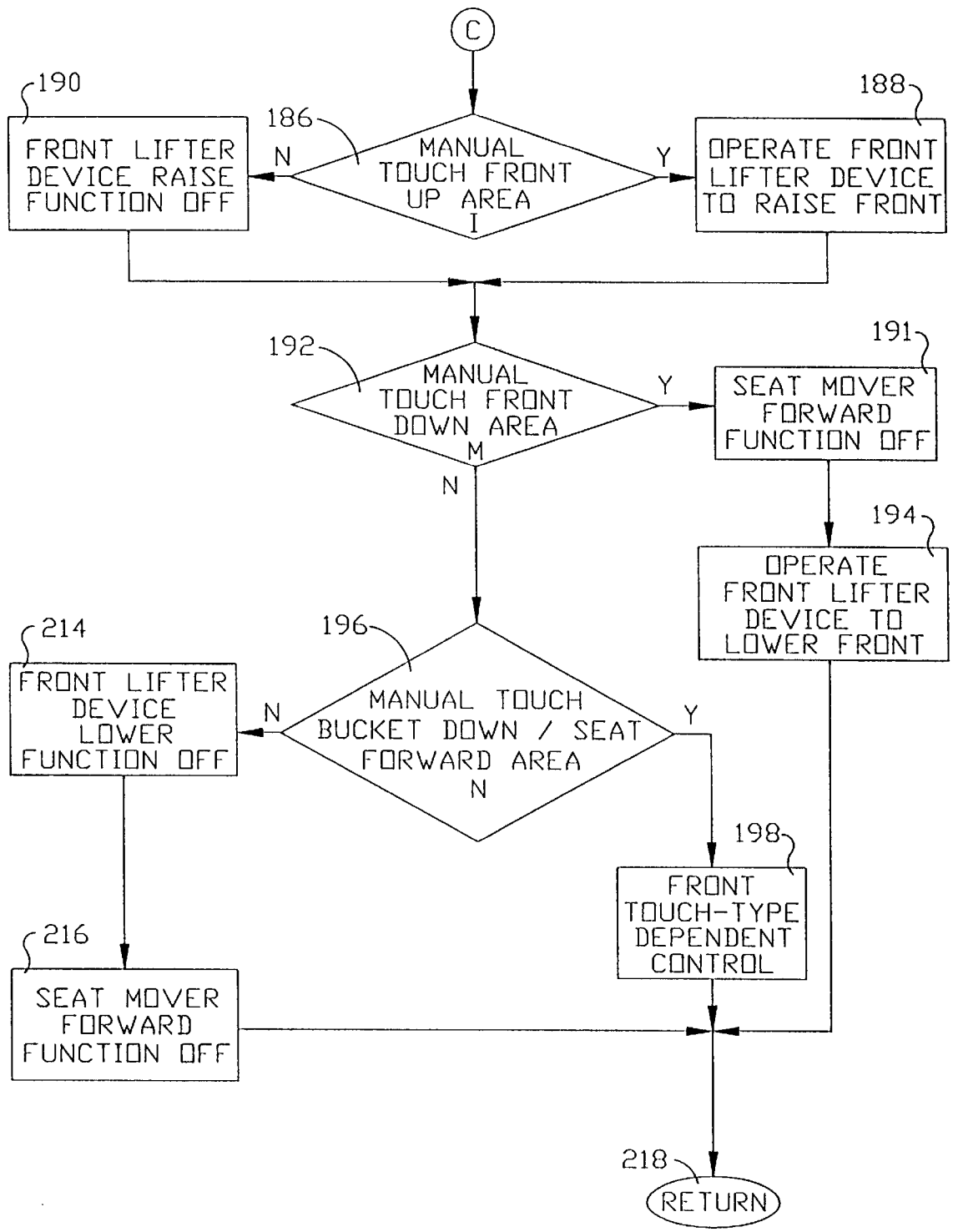

Referring to FIGS. 4A–4C, one example of a control process performed by the process controller 30, in accordance with the present invention, will be appreciated. Hereinafter, the seat adjustment devices 12 are referred to by specific names associated with their functions. For example, the seat adjustment device 12 for adjusting the inclination of the seat back 16 is referred to as the inclination device. It is to be understood that the specifically named adjustment devices may be operated in opposite directions to provide two functions. For example, the inclination device is operated in a first direction to recline the seat back 16 and is operated in a second direction to de-recline the seat back. Also, it is to be understood that the specifically named adjustment devices may be utilized alone or in combination to provide a desired seat adjustment. For example, the rear lifter device, alone, adjusts the height of the bucket of the seat 14, and, in combination with the front lifter device, adjusts the height of the entire seat.

The process is initiated at step 100 where initial states of the process controller 30 are set, flags set, memories cleared, etc. The process then proceeds to step 102. At step 102, the process controller 30 retrieves the digital signal provided by the matrix controller 28. As discussed above, the digital signal provided by the matrix controller 28 is indicative of manual touches to the touch pad 22.

At step 104, the information contained within the digital signal is stored into a buffer memory. The information from the digital signal is saved in the buffer memory for a preselected time duration (e.g., 3.0 seconds) such that the information may be accessed for relatively immediate queries and also so that the information may be accessed at a future point in time. The information in the buffer memory can be used to make determinations concerning time durations of manual touches to the touch pad 22. For example, in the control process, a time delay may be used to ignore an initial portion of a touch or a debounce function may be used to ignore a relatively short duration touch. The buffer memory can provide information on the time of initiation of the touch. Thus, one function of the buffer memory is to provide information used to prevent erroneous operation of the adjustment devices 12. Further uses of the information within the buffer memory are set forth below.

At step 106, the process controller 30 determines whether a manual touch is present within zone A. A touch within zone A is a request to recline the seat back 16. Accordingly, if the determination at step 106 is affirmative, the process controller 30 jumps to step 108 and provides a signal to energize the inclination device to recline the seat back 16. If it is determined in step 106 that the seat back zone A is not presently being touched (determination in step 106 is negative), the process controller 30 jumps to step 110 instead of step 108. In step 110, the process controller 30 provides a signal to stop the recline operation of the inclination device, i.e., the recline function is turned OFF. Of course, if the inclination device was not being operated to recline the seat back 16, the process controller 30 just maintains the OFF status of the recline function. The process controller 30 proceeds from step 108 or step 110 to step 112.

It will be noted that the inclination device will still be energized when the process controller 30 goes from step 108 to step 112. Thus, the inclination device remains energized to recline the seat back 16 as the process controller 30 proceeds through the remaining steps of the FIGS. 4A–4C process. The process controller 30 performs the FIGS. 4A–4C process repeatedly, with each repetition taking only a short time. The inclination device remains energized to recline the seat back 16 until the process controller again reaches step 106 and the zone A is then not being touched. Thus, the inclination device will stay energized until the manual touch of zone A is discontinued, at which time the recline function of the inclination device is turned OFF. Accordingly, the amount of adjustment (i.e., the amount of recline) is dependent upon the time duration of the manual touch within zone A.

Returning to the FIG. 4A portion of the process, at step 112 the process controller 30 determines whether a manual touch is present within zone B to indicate a request to de-recline the seat back 16. If the determination in step 112 is affirmative, then the inclination device is energized to de-recline the seat back 16 at step 114.

It is to be understood that several seat adjustment functions can occur simultaneously. However, seat adjustment functions which are accomplished by operation of a device in opposite directions can not simultaneously occur. Accordingly, it is to be understood that the process controller 30 has means to block attempts to energize a device in both directions simultaneously, such as an error checking function. For example, if the inclination device is being energized to recline the seat back (step 108), then the inclination device cannot be energized to de-recline the seat back, even if step 114 is reached.

If the determination in step 112 is negative, the process controller 30 jumps to step 116 and the de-recline function of the inclination device is turned OFF. If the inclination device was not being operated to de-recline the seat back 16, the OFF status is merely maintained. Similar to the portion of the process for seat back recline (i.e., steps 106–110), the process controller 30 proceeds from the portion of the process for seat back de-recline (i.e., steps 112–116) to the rest of the process and the energization state (i.e., ON or OFF) of the de-recline function of the inclination device remains the same for the rest of the process. The energization state of the de-recline function of the inclination device can only be changed when step 112 is again reached on a subsequent pass through the process by the process controller 30.

Similar process steps 118–158 and 186–190 are performed in response to manual touches within other zones (i.e., zones C–I and L). For example, the process controller 30 can provide a signal to energize the upper lumbar device to move either in or out, depending upon whether a manual touch is sensed in zone C or in zone D. See steps 118–128. Similar steps are performed for controlling operation of the lower lumbar device (zones E and F, steps 130–140), and for controlling the front and rear seat lifter devices simultaneously (zones H and L, steps 142–152). Steps 146 and 152 are special in one respect. The front and rear lifter devices are turned "off" only if both are then "on" in the related direction. This prevents deactivation of the front lifter device when the front lifter device, alone, is being operated to perform its function, and similarly prevents deactivation of the rear lifter device when the rear lifter device, alone, is being operated to perform its function.

Also, similar steps are performed to raise the bucket of the seat 14 with the rear lifter device (zone G, steps 154–158) and raise the front of the seat with the front lifter device (zone I, steps 186–190). The steps 118–158 and 186–190 for these zones (C–I and L) are functionally similar to the above-described steps 106–116, hence steps 118–158 and 186–190 are not described in detail.

For the zones J and K, the process controller 30 proceeds from step 156 or 158 to step 160. At step 160, the process controller 30 determines whether a manual touch is present within zone K. If the determination within step 160 is affirmative, then the rearward movement function of the seat mover is turned, or maintained, OFF at step 161 and the rear lifter device is operated to lower the bucket of the seat 14 at step 162. After completion of step 162, the process controller 30 jumps to step 186 and the process continues. The process controller 30 does not proceed to a step which would turn OFF (i.e., de-energize) the seat bucket lowering function of the rear lifter device at this time because zone J can also control the seat bucket lowering function of the rear lifter device.

When the determination within step 160 is negative, the process controller 30 jumps to step 164. At step 164, the process controller 30 determines whether a manual touch is present within zone J. If the determination within step 164 is affirmative, then the process controller jumps to step 166. Manual touches within zone J are associated with two different seat adjustments, i.e., lowering the bucket of the seat 14 and moving the entire seat rearward. A non-moving (i.e., non-swiping) touch to zone J is a request to lower the rear or the bucket of the seat 14, and a touch to zone J which is the end of a swipe from zone L, through zone K, to zone J is a request to move the entire seat rearward. Accordingly, the process controller 30 performs a procedure to discriminate between the two touch types and to control the appropriate seat adjustment device.

The procedure within the step 166 (FIG. 5) is initiated at step 168 and proceeds to step 170. At step 170, the process controller determines whether the touch within zone J occurred because of a swipe to zone J which was initiated at zone L. In one example, this determination is accomplished by determining whether the touch within zone J was preceded by a touch to zone K which lasted for a time duration within a predetermined time duration range (e.g., 0.5 to 0.75 seconds), and determining whether the touch within zone K was preceded by a touch within zone L which lasted for a time duration within a predetermined time duration range (e.g., 0.5 to 2.0 seconds). The information regarding the previous occurrence of the touches within zones K and L is accessed from the buffer memory within the process controller 30.

If the determination at step 170 is affirmative, a rearward seat movement is requested. The process controller 30 jumps to step 172, wherein the seat bucket lowering function of the rear lifter device is turned, or maintained, OFF. The lowering function of the rear lifter device is OFF because lowering the bucket of the seat 14 is not requested. The process controller 30 proceeds to step 174 wherein the process controller provides a signal to operate the seat mover to move the entire seat 14 rearward. It is to be noted at this point that the rearward movement of the seat 14 is initiated when the process controller 30 determines that the requisite swipe has occurred. The rearward movement continues so long as the finger tip 48 is held in contact with the touchable areas 24 within zone J at the end of the swipe. When the finger tip 48 is removed, during the next pass through process, the determination at step 164 will be negative and the movement of the seat 14 is stopped. The process controller 30 proceeds to return step 180, and the process (FIGS. 4A–4C) of the process controller continues.

If the determination at step 170 (FIG. 5) is negative, lowering the bucket of the seat 14 is likely requested. However, it is to be noted that a rearward swipe ends at zone J and the amount of seat movement is related to the duration of time that the finger tip 48 is held against the touchable areas 24 within zone J at the end of the swipe. When a relatively large rearward seat movement is requested, the finger tip 48 is held within the zone J for a relatively long time. As time progresses during such a relatively long touch (i.e., while the finger tip is held within zone J after the swipe), the instantaneous signal from the matrix controller 28 will loose its "appearance" of a swipe-type signal (i.e., the swiping action would have occurred a relatively long time ago and the instantaneous signal indicates a non-swiping touch). If the duration of the touch to zone J at the end of the swipe is very long, the determination at step 170 may be negative, despite the fact that rearward movement is still being requested. Accordingly, after a negative determination within step 170 the process controller 30 jumps to step 175. At step 175, the process controller 30 determines if the seat 14 is currently being moved rearward by the seat mover (i.e., as part of a relatively large rearward seat movement).

If the determination at step 175 is affirmative, then the requested seat adjustment is to move the seat 14 rearward and not to lower the bucket of the seat. The signal from the matrix controller 28 merely "appeared" to be a request to lower the bucket of the seat 14. Upon the affirmative at step 175, the process controller 30 proceeds to return step 180 and does not operate the rear lifter device to lower the bucket of the seat 14.

If determination at step 175 is negative, then the signal from matrix controller 28 truly is a request to lower the bucket of the seat 14. The process controller 30 jumps to step 176, wherein the seat mover rearward movement function is turned, or maintained, OFF because moving the seat 14 in a rearward direction is not requested. The process controller 30 proceeds to step 178 wherein the rear lifter device is operated to lower the bucket of the seat 14. The process controller 30 then proceeds to return step 180, and the process (FIGS. 4A–4C) continues.

The operation of the seat mover or the rear lifter device resulting from step 166 continues until the touch in zone J is discontinued and the process again reaches step 164 (FIG. 4B). At step 164, the determination is negative because the touch to zone J is discontinued, and the process controller 30 jumps to step 182. The seat bucket lowering function of the rear lifter device is turned, or maintained, OFF. The process controller proceeds to step 184 and the rearward movement function of the seat mover is turned, or maintained, OFF.

Process steps 192–216 (FIGS. 4C and 6) corresponding to zones M and N are similar to the steps 160–184 for zones K and J. Specifically, step 198 (FIG. 4C) includes a procedure (FIG. 6) for causing operation of either the seat mover in its forward movement function or the front lifter device in its lowering function, and blocking the operation of the other.

At step 218 (FIG. 4C), the process controller 30 has completed its process and jumps to step 220 (FIG. 4A) to repeat the process. Each loop through the process is relatively quick, for example less than 20 ms.

From the above description of the invention, those skilled in the art will perceive improvements, changes and modifications. For example the means for guiding the manual touches to the touchable areas 22 could have a structure other than the cover bezel 44 with its apertures 58 and 62. One possibility is to use a raised rib on the touch pad 22 to guide the manual touches. Another modification is that the process controller 30 may have means to detect errors in the signals from the matrix controller 28. In addition, the process controller 30 may include hard wired circuits to perform some of the process steps shown in FIGS. 4–6. Further, it will be appreciated that if an object other than a seat is to be adjusted, then the touchable areas will be in a representation of the object and the zones of touchable areas will correspond to adjustable aspects of the object (e.g., for a power window some adjustable aspects are: window down, window up, auto-down, and auto-up). Such improvements, changes and modifications within the skill of the art are intended to be covered by the appended claims.

Having described the invention, the following is claimed:

1. An apparatus for controlling adjustment devices operable to adjust an object, each of the adjustment devices adjusting an adjustable aspect of the object, said apparatus comprising:

touch pad means having an array of manually touchable areas for providing signals indicative of manual touches to said areas;

a guide adjacent said touch pad means and having surface means defining a representation of the object which corresponds to a shape of the object for guiding manual movement relative to said touch pad means, said areas of said touch pad means within the representation of the object corresponding to adjustable aspects of the object; and control means for receiving the signals provided by said touch pad means and for generating control signals for controlling operation of the adjustment devices responsive to the manual touches to said touch pad means.

2. An apparatus as set forth in claim 1, wherein the object is an adjustable seat.

3. An apparatus as set forth in claim 2, wherein the representation of the seat includes a seat back portion and a seat bottom portion.

4. An apparatus as set forth in claim 2, wherein said guide includes a portion which covers a portion of said areas of said touch pad means and said surface means of said guide defining aperture means for permitting access to said areas of said touch pad means within the representation.

5. An apparatus as set forth in claim 2, said areas of said touch pad means are grouped together in zones of touchable areas, each zone of touchable areas corresponds to an adjustable aspect of the seat.

6. An apparatus as set forth in claim 5, wherein said control means includes means for providing control signals controlling operation of certain adjustment devices in response to non-moving manual touches to said touchable areas of certain zones and controlling operation of certain adjustment devices in response to moving manual touches along said touchable areas of certain zones.

7. An apparatus as set forth in claim 1, wherein said guide includes a portion which covers a portion of said areas of said touch pad means and said surface means of said guide defining aperture means for permitting access to said areas of said touch pad means within the representation.

8. An apparatus as set forth in claim 1, said areas of said touch pad means are grouped together in zones of touchable areas, each zone of touchable areas corresponds to an adjustable aspect of the object.

9. An apparatus as set forth in claim 8, wherein said control means includes means for providing control signals controlling operation of certain adjustment devices in response to non-moving manual touches to said touchable areas of certain zones and controlling operation of certain adjustment devices in response to moving manual touches along said touchable areas of certain zones.

10. An apparatus as set forth in claim 1, wherein said control means includes means for providing control signals controlling operation of certain adjustment devices in response to non-moving manual touches to certain touchable areas and controlling operation of certain adjustment devices in response to moving manual touches to certain touchable areas.

11. A method for controlling adjustment devices operable to adjust an object, each of the adjustment devices adjusting an adjustable aspect of the object, said method comprising:

providing a touch pad means which has an array of manually touchable areas and which provides signals indicative of manual touches to the areas;

providing a guide adjacent the touch pad means which has surface means that define a representation of the object which corresponds to a shape of the object, the areas of the touch pad means within the representation of the object corresponding to adjustable aspects of the object;

providing a control means for receiving the signals provided by the touch pad means;

guiding manual movement by the surface means of the guide relative to the touch pad means; and generating control signals for controlling operation of the adjustment devices responsive to manual touches to the areas of the touch pad means.

12. A method as set forth in claim 11, wherein the object is an adjustable seat and said step of providing a guide comprises providing the guide with the surface means defining a representation of the seat.

13. A method as set forth in claim 12, wherein said step of providing a guide includes covering a portion of the touchable areas and providing at least one aperture defined by the surface means which extends through said guide.

14. A method as set forth in claim 13, wherein said step of providing at least one aperture includes providing one aperture which defines a seat back portion of the representation of the seat and a second aperture which defines a seat bottom portion of the representation of the seat.

15. A method as set forth in claim 11, wherein the areas of the touch pad means are grouped together in zones, said step of guiding manual movement includes guiding a finger to the zone which correspond to desired adjustment aspect of the object.

16. A method as set forth in claim 15, wherein the manual movement includes movement to touch areas of the touch pad within a single zone.

17. A method as set forth in claim 15, wherein the manual movement includes swiping movement to sequentially touch areas of the touch pad in plural zones.

18. A method for controlling adjustment devices operable to adjust a seat, each of the adjustment devices adjusting an adjustable aspect of the seat, said method comprising:

providing a touch pad means which has an array of manually touchable areas and which provides signals indicative of manual touches to the areas;

providing a guide adjacent the touch pad means which has surface means that define a representation of the seat, the areas of the touch pad means within the representation of the seat corresponding to adjustable aspects of the seat;

providing a control means for receiving the signals provided by the touch pad means;

guiding manual movement by the surface means of the guide relative to the touch pad means; and generating control signals for controlling operation of the adjustment devices responsive to manual touches to the areas of the touch pad means.

19. A method as set forth in claim 18, wherein said step of providing a guide includes covering a portion of the touchable areas and providing at least one aperture defined by the surface means which extends through the guide.

20. A method as set forth in claim 19, wherein said step of providing at least one aperture includes providing one aperture which defines a seat back portion of the representation of the seat and a second aperture which defines a seat bottom portion of the representation of the seat.

21. A method as set forth in claim 18, wherein the areas of the touch pad means are grouped together in zones, said step of guiding manual movement includes guiding a finger to the zones which correspond to the desired adjustment aspect of the seat.

22. A method as set forth in claim 21, wherein the manual movement includes movement to touch areas of the touch pad within a single zone.

23. A method as set forth in claim 21, wherein the manual movement includes swiping movement to sequentially touch areas of the touch pad in plural zones.

24. An apparatus for controlling adjustment devices operable to adjust a seat, each of the adjustment devices adjusting an adjustable aspect of the seat, said apparatus comprising:

touch pad means having an array of manually touchable areas for providing signals indicative of manual touches to said areas;

a guide adjacent said touch pad means and having surface means defining a representation of the seat for guiding manual movement relative to said touch pad means, said areas of said touch pad means within the representation of the seat corresponding to adjustable aspects of the seat, said guide overlaying said touch pad means, a portion of said touch pad means being covered by said guide, said surface means of said guide defining at least one aperture for permitting manual touch to said areas of said touch pad means within the representation defined by said surface means, said guide having two apertures, one aperture of said guide defining a seat back portion of the representation of the seat and the second aperture of said guide defining a seat bottom portion of the representation of the seat; and control means for receiving the signals provided by said touch pad means and for generating control signals for controlling operation of the adjustment devices responsive to the manual touches to said touch pad means.

25. An apparatus for controlling adjustment devices operable to adjust a seat, each of the adjustment devices adjusting an adjustable aspect of the seat, said apparatus comprising:

touch pad means having an array of manually touchable areas for providing signals indicative of manual touches to said areas;

a guide adjacent said touch pad means and having surface means defining a representation of the seat for guiding manual movement relative to said touch pad means, said areas of said touch pad means within the representation of the seat corresponding to adjustable aspects of the seat, said areas of said touch pad means being grouped together in zones of touchable areas, each zone of touchable areas corresponding to an adjustable aspect of the seat; and control means for receiving the signals provided by said touch pad means and for generating control signals for controlling operation of the adjustment devices responsive to the manual touches to said touch pad means, said control means including means for providing control signals controlling operation of certain adjustment devices in response to non-swiping touches to said touchable areas of certain zones and controlling operation of certain adjustment devices in response to swiping manual touches along said touchable areas of certain zones.

26. An apparatus for controlling adjustment devices operable to adjust an object, each of the adjustment devices adjusting an adjustable aspect of the object, said apparatus comprising:

a touch pad having a continuous field of touchable areas, each touchable area being immediately adjacent to at least one other touchable area, said touch pad including circuitry extending through said touchable areas that is responsive to applied pressure and that convey at least one signal indicative of the touchable area to which the pressure is applied;

a bezel overlaying the touch pad and having at least one opening defined by a surface in a shape that represents the object, at least some of the touchable areas of the touch pad being accessible through said opening and the touchable areas that are accessible correspond to adjustable aspects of the object, said surface defining said opening guiding manual movement to a desired touchable area; and a controller operatively connected to said circuitry of said touch pad for receiving the signal from said touch pad, said controller includes means for processing the signal from said touch pad and for generating at least one control signal that controls operation of the adjustment devices.

27. An apparatus as set forth in claim 26, wherein the object is an adjustable seat.

28. An apparatus as set forth in claim 26, wherein the bezel covers some touchable areas that do not correspond to adjustable aspects of the object.

* * * * *